United States Patent
Nguyen et al.

(10) Patent No.: US 9,270,176 B1
(45) Date of Patent: Feb. 23, 2016

(54) CONSTANT ON-TIME SWITCHING CONVERTER WITH INTERNAL RAMP COMPENSATION AND CONTROL METHOD THEREOF

(71) Applicant: Monolithic Power Systems, Inc., San Jose, CA (US)

(72) Inventors: James H. Nguyen, San Jose, CA (US); Jinghai Zhou, San Jose, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 0 days.

(21) Appl. No.: 14/548,078

(22) Filed: Nov. 19, 2014

(51) Int. Cl.
*H03K 3/00* (2006.01)
*H02M 3/158* (2006.01)

(52) U.S. Cl.
CPC ................................ *H02M 3/158* (2013.01)

(58) Field of Classification Search
None
See application file for complete search history.

(56) References Cited

U.S. PATENT DOCUMENTS

| | | | |
|---|---|---|---|
| 8,773,088 B2 * | 7/2014 | Menegoli et al. | H02M 3/158 323/267 |
| 8,786,269 B2 * | 7/2014 | Menegoli et al. | H02M 3/156 323/282 |
| 2010/0181983 A1 | 7/2010 | Ouyang | |
| 2012/0146606 A1 | 6/2012 | Li et al. | |
| 2013/0257399 A1 | 10/2013 | Jiang et al. | |

* cited by examiner

*Primary Examiner* — An Luu
(74) *Attorney, Agent, or Firm* — Perkins Coie LLP

(57) ABSTRACT

A switching converter includes a main transistor, an inductor coupled to the main transistor, a feedback circuit configured to generate a feedback signal indicative of the output voltage and a controller configured to generate a control signal to control the main transistor. The controller has an on timer, a ramp generator, a comparing circuit and a logic circuit. The on timer is configured to generate an on-time control signal. The ramp generator is configured to generate a ramp signal, wherein the level of the ramp signal is regulated to be equal to the level of a common mode voltage when the status of the main transistor is changed from OFF to ON. The comparing circuit generates a comparison signal based on the ramp signal, the common mode voltage, a reference signal and the feedback signal. The logic circuit generates the control signal based on the on-time control signal and the comparison signal.

18 Claims, 17 Drawing Sheets

CONSTANT ON-TIME SWITCHING CONVERTER WITH INTERNAL RAMP COMPENSATION AND CONTROL METHOD THEREOF

TECHNICAL FIELD

The present invention generally relates to electronic circuits, and more particularly, relates to constant on-time switching converters and control methods thereof.

BACKGROUND

Constant on-time (COT) control is widely used in power supply area because of its good transient response, simple structure and smooth mode transition. However, for switching converters using COT control, there may be sub-harmonic oscillation at the output voltage if the estimated serial resistance (ESR) of the output capacitor is not big enough.

To eliminate the sub-harmonic oscillation, a ripple injection method is usually employed. FIG. 1 is a block diagram of a prior constant on-time switching converter. As shown in FIG. 1, a resistor Rr1 and a capacitor Cr1 are used to generate a ramp signal which is in phase with the current flowing through the inductor L. Through a capacitor Cr2, the ramp signal is coupled to a feedback signal FB indicative of the output voltage VOUT to eliminate the sub-harmonic oscillation.

For the prior constant on-time switching converter shown in FIG. 1, the value of Rr1, Cr1 and Cr2 are determined by the input voltage VIN, the output voltage VOUT and the switching frequency of the switching converter. That means, once the application is changed, the value of Rr1, Cr1 and Cr2 should also be changed. This apparently makes circuit design complex. Furthermore, the ramp signal shown in FIG. 1 is sensitive to noise, which harms line and load regulation of the switching converter.

SUMMARY

The embodiments of the present invention are directed to a controller used in a switching converter, wherein the switching converter comprises a main transistor and an inductor coupled to the main transistor, and is configured to provide an output voltage. The controller comprises an on timer configured to generate an on-time control signal, a ramp generator configured to generate a ramp signal, a comparing circuit and a logic circuit. The comparing circuit is coupled to the ramp generator, wherein the comparing circuit generates a comparison signal based on the ramp signal, a common mode voltage, a reference signal and a feedback signal indicative of the output voltage. The logic circuit is coupled to the on timer and the comparing circuit, wherein based on the on-time control signal and the comparison signal, the logic circuit generates a control signal to control the main transistor. The ramp generator comprises an adaptive current lock circuit, a first one-shot circuit, a controllable current source, a first capacitor, a first resistor and a first transistor. The adaptive current lock circuit has a first input terminal, a second input terminal, a third input terminal and an output terminal, wherein the first input terminal is configured to receive the common mode voltage, the second input terminal is coupled to the logic circuit to receive the control signal, the third input terminal is configured to receive the ramp signal, and wherein based on the common mode voltage, the control signal and the ramp signal, the adaptive current lock circuit generates a current control signal at the output terminal. The first one-shot circuit has an input terminal and an output terminal, wherein the input terminal is coupled to the logic circuit to receive the control signal. The controllable current source has a first terminal, a second terminal and a control terminal, wherein the first terminal is configured to receive a power supply voltage, the control terminal is coupled to the output terminal of the adaptive current lock circuit to receive the current control signal. The first capacitor has a first terminal and a second terminal, wherein the first terminal is coupled to the second terminal of the controllable current source and is configured to provide the ramp signal, the second terminal is coupled to a reference ground. The first resistor has a first terminal and a second terminal, wherein the first terminal is coupled to the first terminal of the first capacitor. The first transistor has a first terminal, a second terminal and a control terminal, wherein the first terminal is coupled to the second terminal of the first resistor, the second terminal is coupled to the reference ground, and the control terminal is coupled to the output terminal of the first one-shot circuit.

The embodiments of the present invention are also directed to a switching converter configured to provide an output voltage. The switching converter comprises a main transistor, an inductor coupled to the main transistor, a feedback circuit configured to generate a feedback signal indicative of the output voltage and a controller configured to generate a control signal to control the main transistor. The controller comprises an on timer, a ramp generator, a comparing circuit and a logic circuit. The on timer is configured to generate an on-time control signal. The ramp generator is configured to generate a ramp signal, wherein the level of the ramp signal is regulated to be equal to the level of a common mode voltage when the status of the main transistor is changed from OFF to ON. The comparing circuit is coupled to the feedback circuit and the ramp generator, wherein the comparing circuit generates a comparison signal based on the ramp signal, the common mode voltage, a reference signal and the feedback signal. The logic circuit is coupled to the on timer and the comparing circuit, wherein the logic circuit generates the control signal based on the on-time control signal and the comparison signal.

Moreover, the embodiments of the present invention are further directed to a control method used in a switching converter, wherein the switching converter comprises a main transistor and an inductor coupled to the main transistor, and is configured to provide an output voltage. The control method comprises: generating an on-time control signal; generating a ramp signal and regulating the level of the ramp signal to be equal to the level of a common mode voltage when the status of the main transistor is changed from OFF to ON; generating a comparison signal based on the ramp signal, the common mode voltage, a reference signal and a feedback signal indicative of the output voltage; and generating a control signal to control the main transistor based on the on-time control signal and the comparison signal.

BRIEF DESCRIPTION OF THE DRAWINGS

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 2:
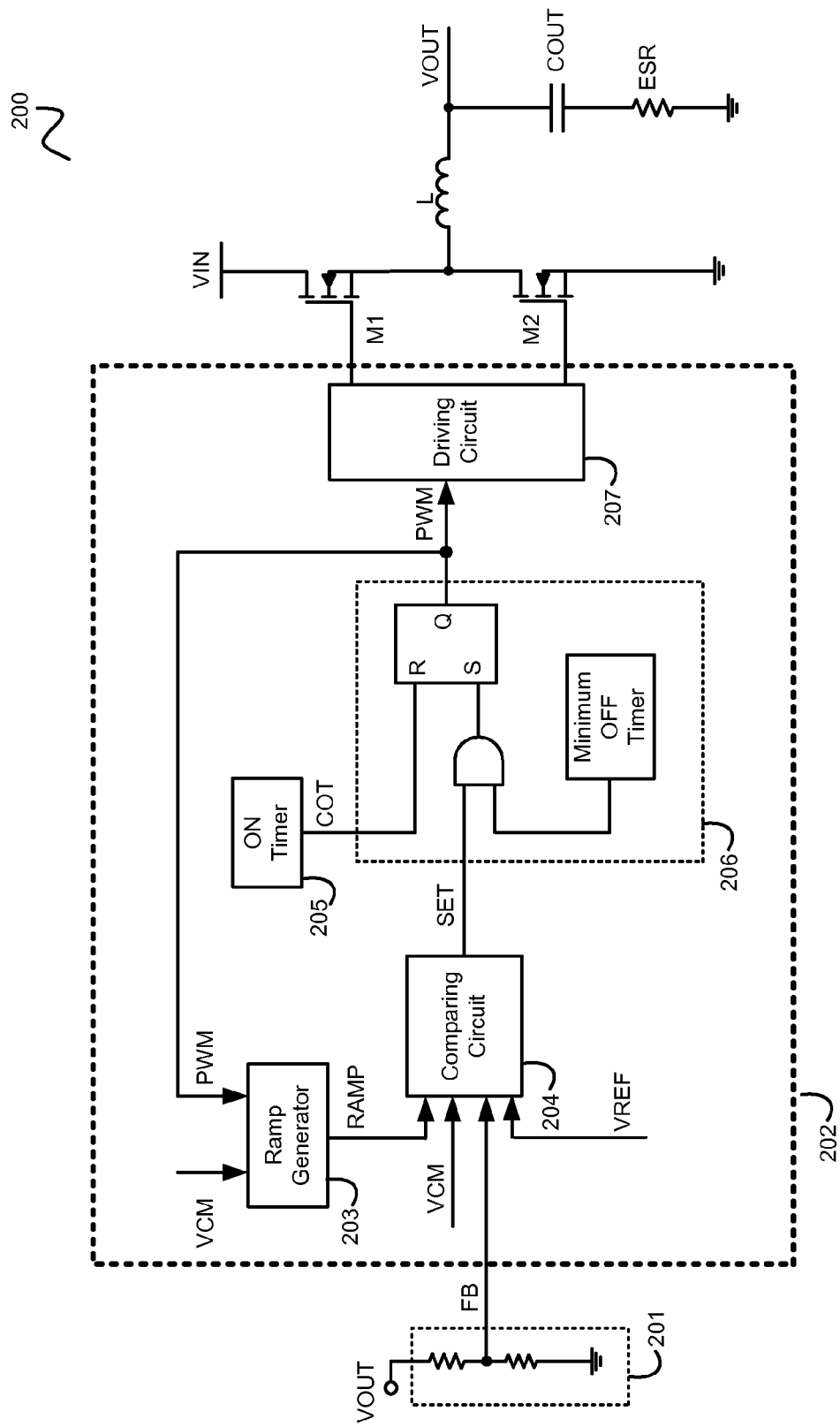
FIG. 2 is a block diagram of a switching converter 200 in accordance with an embodiment of the present invention.

FIG. 2 is a block diagram of a switching converter 200 in accordance with an embodiment of the present invention. The switching converter 200 is configured to convert an input voltage VIN into an output voltage VOUT. It comprises a main transistor M1, a freewheel transistor M2, an inductor L, an output capacitor COUT, a feedback circuit 201 and a controller 202, connected as shown in FIG. 2. The transistors M1 and M2 may be any controllable semiconductor devices, such as MOSFET (metal oxide semiconductor field effect transistor), IGBT (isolated gate bipolar transistor) and so on. The switching converter 200 shown in FIG. 2 is configured in synchronous BUCK converter. It is obvious to those skilled in the art, however, that the freewheel transistor M2 may be replaced by a freewheel diode to form a non-synchronous BUCK converter, and the switching converter 200 may also be configured in any other suitable topologies, such as BUCK-BOOST converter and so on.

The feedback circuit 201 is coupled to the output capacitor COUT. It is configured to receive the output voltage VOUT and generate a feedback signal FB indicative of the output voltage VOUT. The feedback circuit 201 may consist of a resistor divider as shown in FIG. 2. In some embodiments, the feedback circuit 201 may be just a lead and the feedback signal FB is equal to the output voltage VOUT.

The controller 202 is coupled to the feedback circuit 201 and is configured to control the transistors M1 and M2 based on the feedback signal FB. The controller 202 comprises a ramp generator 203, a comparing circuit 204, an on timer 205, a logic circuit 206 and a driving circuit 207. The ramp generator 203 is configured to generate a ramp signal RAMP, wherein the level of the ramp signal RAMP is regulated to be equal to the level of a common mode voltage VCM when the status of the main transistor M1 is changed from OFF to ON. In some embodiments, the ramp signal RAMP is discharged through a resistor in a predetermined time period when the status of the main transistor M1 is changed from ON to OFF. After then, the ramp signal RAMP is charged to keep increasing toward the common mode voltage VCM where the status of the main transistor M1 is changed from OFF to ON. By doing so, the rising slope of the ramp signal RAMP is adaptive to the duty cycle of the main transistor M1 such that the rising slope of the ramp signal RAMP increases as the duty cycle increases.

The comparing circuit 204 is coupled to the feedback circuit 201 and the ramp generator 203, wherein the comparing circuit 204 generates a comparison signal SET based on the ramp signal RAMP, the common mode voltage VCM, a reference signal VREF and the feedback signal FB. The comparing circuit 204 may compare the sum of the reference signal VREF and the ramp signal RAMP with the sum of the feedback signal FB and the common mode voltage VCM to generate the comparison signal SET.

The on timer 205 is configured to generate an on-time control signal COT to control the on-time of the main transistor M1. In one embodiment, the on-time of the main transistor M1 is set to be constant, or be variable with the input voltage VIN and output voltage VOUT. The logic circuit 206 is coupled to the on timer 205 and the comparing circuit 204. Based on the on-time control signal COT and the comparison signal SET, the logic circuit 206 generates a control signal PWM to control the transistors M1 and M2 through the driving circuit 207. In some embodiments, the logic circuit 206 comprises a minimum off timer, an AND gate and a RS flip-flop, connected as shown in FIG. 2.

Figure 1:
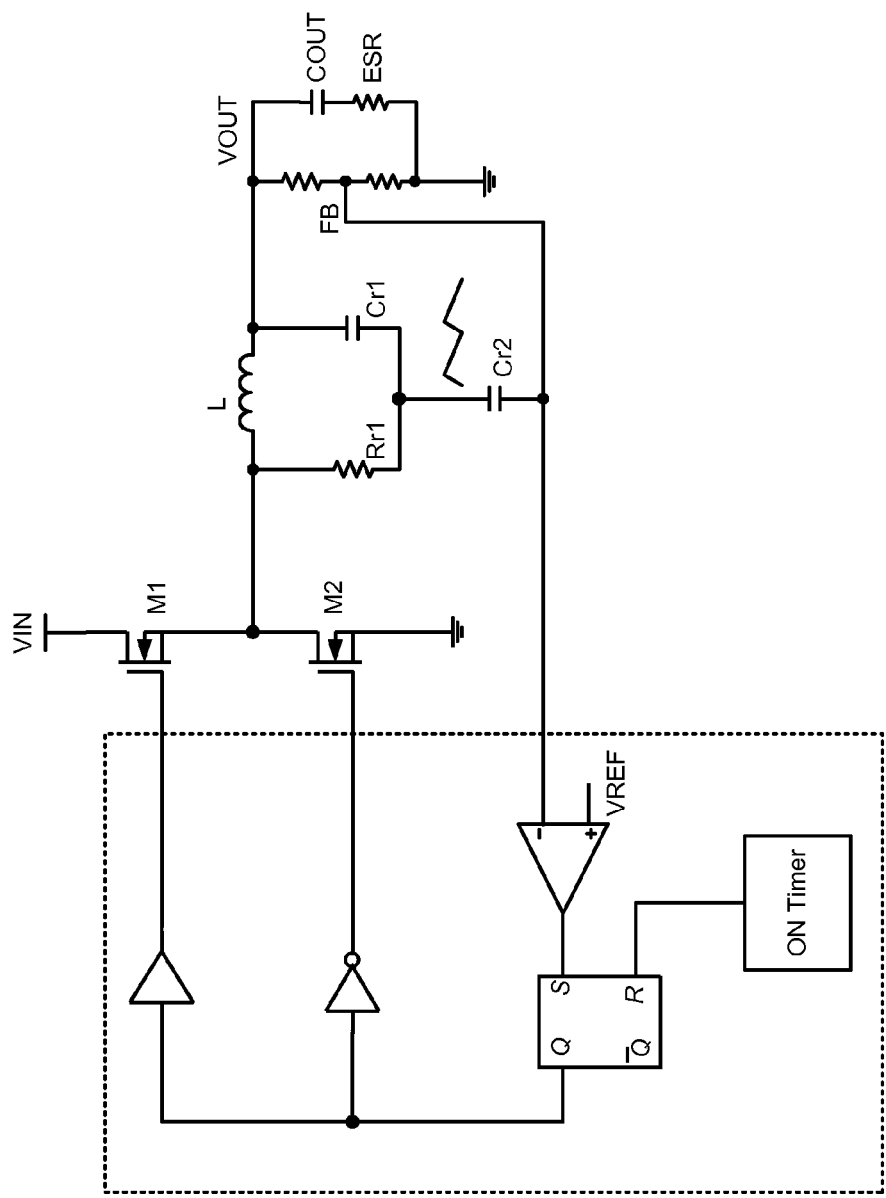
FIG. 1 is a block diagram of a prior constant on-time switching converter.

Compared with the prior art shown in FIG. 1, the switching converter 200 has an internal ramp compensation inside the controller, which is simple to use and saves the external components. Furthermore, the ramp signal RAMP of the switching converter 200 is stable with different input voltage, output voltage and switching frequency and is less sensitive to noise. Thus the circuit design is simplified, the line and load regulation of the switching converter are also improved.

Figure 3:
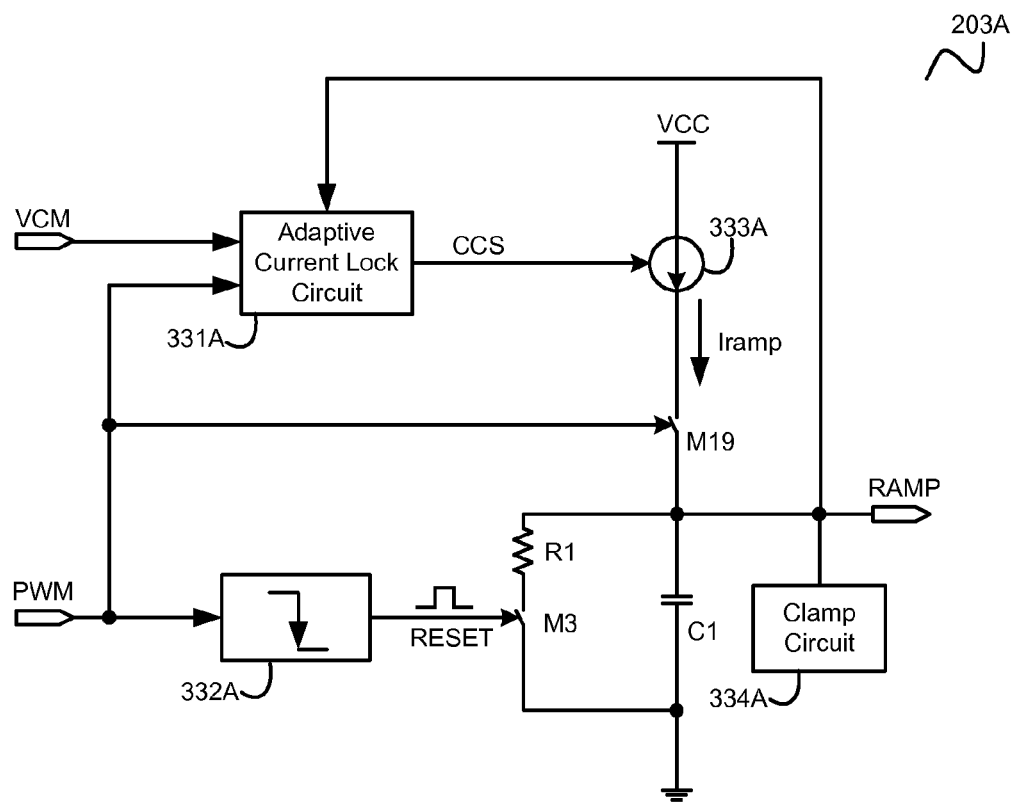
FIG. 3 schematically illustrates a ramp generator 203A in accordance with an embodiment of the present invention.

FIG. 3 schematically illustrates a ramp generator 203A in accordance with an embodiment of the present invention. The ramp generator 203A comprises an adaptive current lock circuit 331A, a one-shot circuit 332A, a controllable current source 333A, a capacitor C1, a resistor R1 and transistors M3, M19. The adaptive current lock circuit 331A has a first input terminal, a second input terminal, a third input terminal and an output terminal, wherein the first input terminal is configured to receive the common mode voltage VCM, the second input terminal is coupled to the logic circuit to receive the control signal PWM, the third input terminal is configured to receive the ramp signal RAMP. Based on the common mode voltage VCM, the control signal PWM and the ramp signal RAMP, the adaptive current lock circuit 331A generates a current control signal CCS at the output terminal.

The one-shot circuit 332A has an input terminal and an output terminal, wherein the input terminal is coupled to the logic circuit to receive the control signal PWM, and wherein based on the control signal PWM, the one-shot circuit 332A generates a signal RESET at the output terminal. The controllable current source 333A has a first terminal, a second terminal and a control terminal, wherein the first terminal is configured to receive a power supply voltage VCC, the control terminal is coupled to the output terminal of the adaptive current lock circuit 331A to receive the current control signal CCS.

The capacitor C1 has a first terminal and a second terminal, wherein the first terminal is configured to provide the ramp signal RAMP, the second terminal is coupled to a reference ground. The resistor R1 has a first terminal and a second terminal, wherein the first terminal is coupled to the first terminal of the capacitor C1. The transistor M3 has a first terminal, a second terminal and a control terminal, wherein the first terminal is coupled to the second terminal of the resistor R1, the second terminal is coupled to the reference ground, and the control terminal is coupled to the output terminal of the one-shot circuit 332A to receive the signal RESET.

The transistor M19 has a first terminal, a second terminal and an output terminal, wherein the first terminal is coupled to the second terminal of the adaptive current source 333A, the second input terminal is coupled to the first terminal of the capacitor C1, the control terminal is coupled to the logic circuit to receive the control signal PWM. The transistor M19 is turned off to maintain the ramp signal RAMP when the main transistor is ON.

In one embodiment, the one-shot circuit 332A is a falling edge one-shot circuit which is triggered to generate a pulse at the falling edge of the control signal PWM. However, the one-shot circuit 332A may also be a rising edge one-shot circuit as long as it can turn on the transistor M3 to discharge the capacitor C1 for a predetermined time period when the status of the main transistor M1 is changed from ON to OFF.

In one embodiment, the ramp generator 203A further comprises a clamp circuit 334A coupled to the first terminal of the capacitor C1. The clamp circuit 334A is configured to limit the maximum level of the ramp signal RAMP to a clamping voltage VCLAMP.

When the status of the main transistor M1 is changed from ON to OFF, the transistor M19 is turned on. The transistor M3 is turned on for a predetermined time period to discharge the capacitor C1 through the resistor R1. The ramp signal RAMP decreases. Then, the transistor M3 is turned off. The capacitor C1 is charged by the controllable current source 333A and the ramp signal RAMP increases. When the status of the main transistor M1 is changed from OFF to ON, the transistor M19 is turned off. The charge of the capacitor C1 is ceased and the ramp signal RAMP is maintained until the status of the main transistor M1 is changed into OFF again.

The current Iramp provided by the controllable current source 333A is adjusted by the adaptive current lock circuit 331A, so as to regulate the level of the ramp signal RAMP to be equal to the level of the common mode voltage VCM when the status of the main transistor M1 is changed from OFF to ON. If the level of the ramp signal RAMP is larger than the level of the common mode voltage VCM when the status of the main transistor M1 is changed from OFF to ON, the adaptive current lock circuit 331A will decrease the current Iramp, and vice versa.

Figure 4:
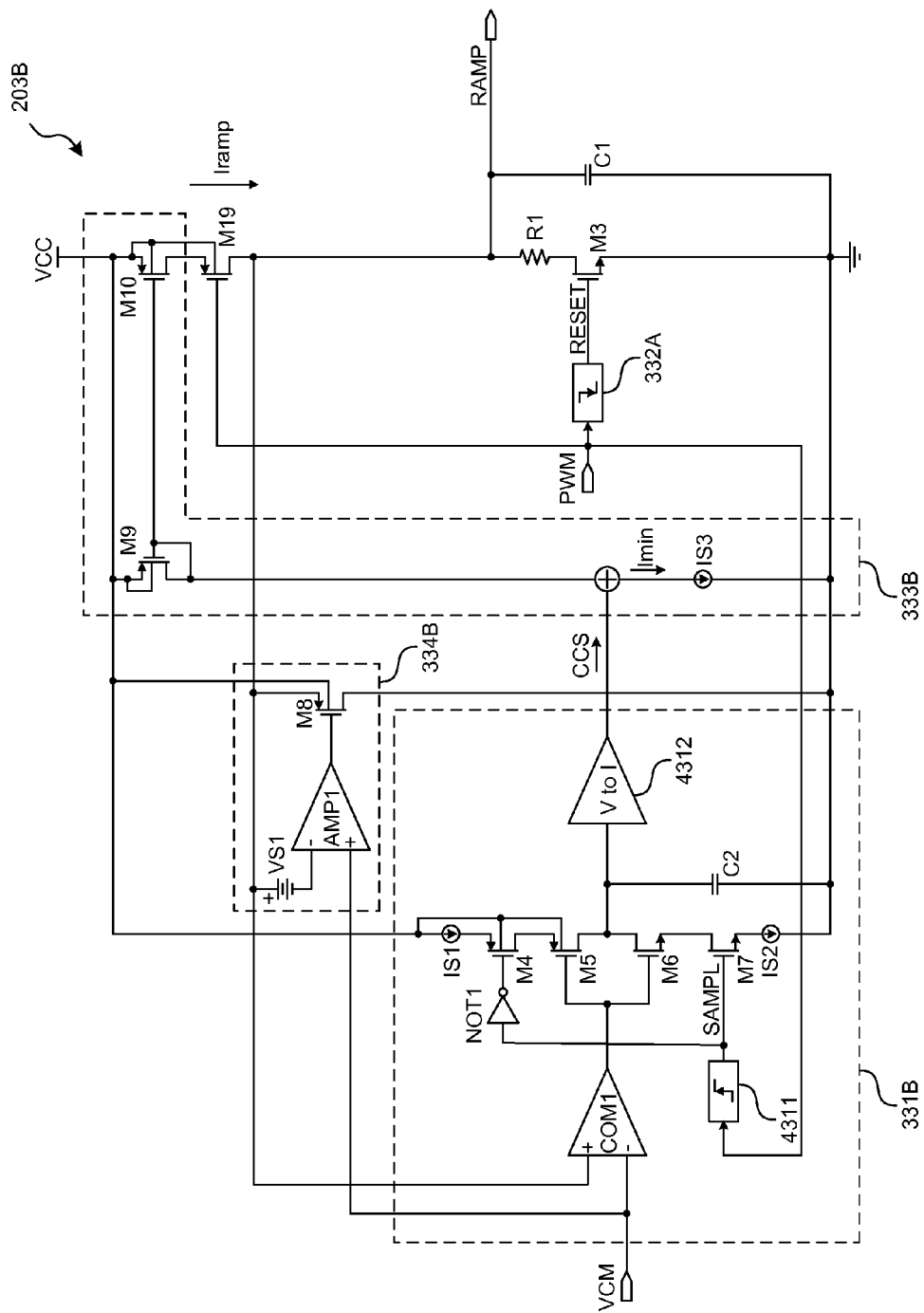
FIG. 4 schematically illustrates a ramp generator 203B in accordance with an embodiment of the present invention.

FIG. 4 schematically illustrates a ramp generator 203B in accordance with an embodiment of the present invention. In the embodiment shown in FIG. 4, the adaptive current lock circuit 331B comprises a comparator COM1, a one-shot circuit 4311, a NOT gate NOT1, current source IS1, IS2, transistors M4~M7, a capacitor C2 and a voltage to current converter 4312. The comparator COM1 has a non-inverting input terminal, an inverting input terminal and an output terminal, wherein the non-inverting input terminal is coupled to the first terminal of the capacitor C1 to receive the ramp signal RAMP, the inverting input terminal is configured to receive the common mode voltage VCM. The one-shot circuit 4311 has an input terminal and an output terminal, wherein the input terminal is coupled to the logic circuit to receive the control signal PWM, and wherein based on the control signal PWM, the one-shot circuit 4311 generates a signal SAMPL at the output terminal. The NOT gate NOT1 has an input terminal and an output terminal, wherein the input terminal is coupled to the output terminal of the one-shot circuit 4311 to receive the signal SAMPL.

The current source IS1 has a first terminal and a second terminal, wherein the first terminal is configured to receive the power supply voltage VCC. The transistor M4 has a first terminal, a second terminal and a control terminal, wherein the first terminal is coupled to the second terminal of the current source IS1, the control terminal is coupled to the output terminal of the NOT gate NOT1. The transistor M5 has a first terminal, a second terminal and a control terminal, wherein the first terminal is coupled to the second terminal of the transistor M4, the control terminal is coupled to the output terminal of the comparator COM1. The transistor M6 has a first terminal, a second terminal and a control terminal, wherein the first terminal is coupled to the second terminal of the transistor M5, the control terminal is coupled to the output terminal of the comparator COM1. The transistor M7 has a first terminal, a second terminal and a control terminal, wherein the first terminal is coupled to the second terminal of the transistor M6, and the control terminal is coupled to the output terminal of the one-shot circuit 4311 to receive the signal SAMPL. The current source IS2 has a first terminal and a second terminal, wherein the first terminal is configured to the second terminal of the transistor M7, the second terminal is coupled to the reference ground.

The capacitor C2 has a first terminal and a second terminal, wherein the first terminal is coupled to the second terminal of the transistor M5 and the first terminal of the transistor M6, the second terminal is coupled to the reference ground. The voltage to current converter 4312 has an input terminal and an output terminal, wherein the input terminal is coupled to the first terminal of the capacitor C2, and wherein based on the voltage across the capacitor C2, the voltage to current converter 4312 generates the current control signal CCS at the output terminal.

In one embodiment, the one-shot circuit 4311 is a rising edge one-shot circuit which is triggered to generate a pulse at the rising edge of the control signal PWM. However, the one-shot circuit 4311 may also be a falling edge one-shot circuit as long as it can turn on the transistors M4 and M7 for a predetermined time period when the status of the main transistor M1 is changed from OFF to ON.

The controllable current source 333B comprises a current mirror consisting of transistors M9 and M10. The current mirror has an input terminal and an output terminal, wherein the input terminal is configured to receive a sum of the current control signal CCS and a minimum current Imin provided by a current source IS3, the output terminal is coupled to the first terminal of the capacitor C1 to provide the current Iramp.

The clamp circuit 334B comprises a voltage source VS1, an error amplifier AMP1 and a transistor M8. The voltage source VS1 has an anode and a cathode, wherein the anode is coupled to the first terminal of the capacitor C1 to receive the ramp signal RAMP. The error amplifier AMP1 has a non-inverting input terminal, an inverting input terminal and an output terminal, wherein the non-inverting input terminal is configured to receive the common mode voltage VCM, the inverting input terminal is coupled to the cathode of the voltage source VS1. The transistor M8 has a first terminal, a second terminal and a control terminal, wherein the first terminal is coupled to the first terminal of the capacitor C1, the second terminal is coupled to the reference ground, the control terminal is coupled to the output terminal of the error amplifier AMP1.

The operational principle of the ramp generator 203B will be described below with reference to FIG. 5, which illustrates waveforms of the ramp generator 203B during continuous current mode (CCM) in accordance with an embodiment of the present invention, wherein D is the duty cycle of the main transistor M1 and Ts is the switching period of the switching converter.

Figure 5:
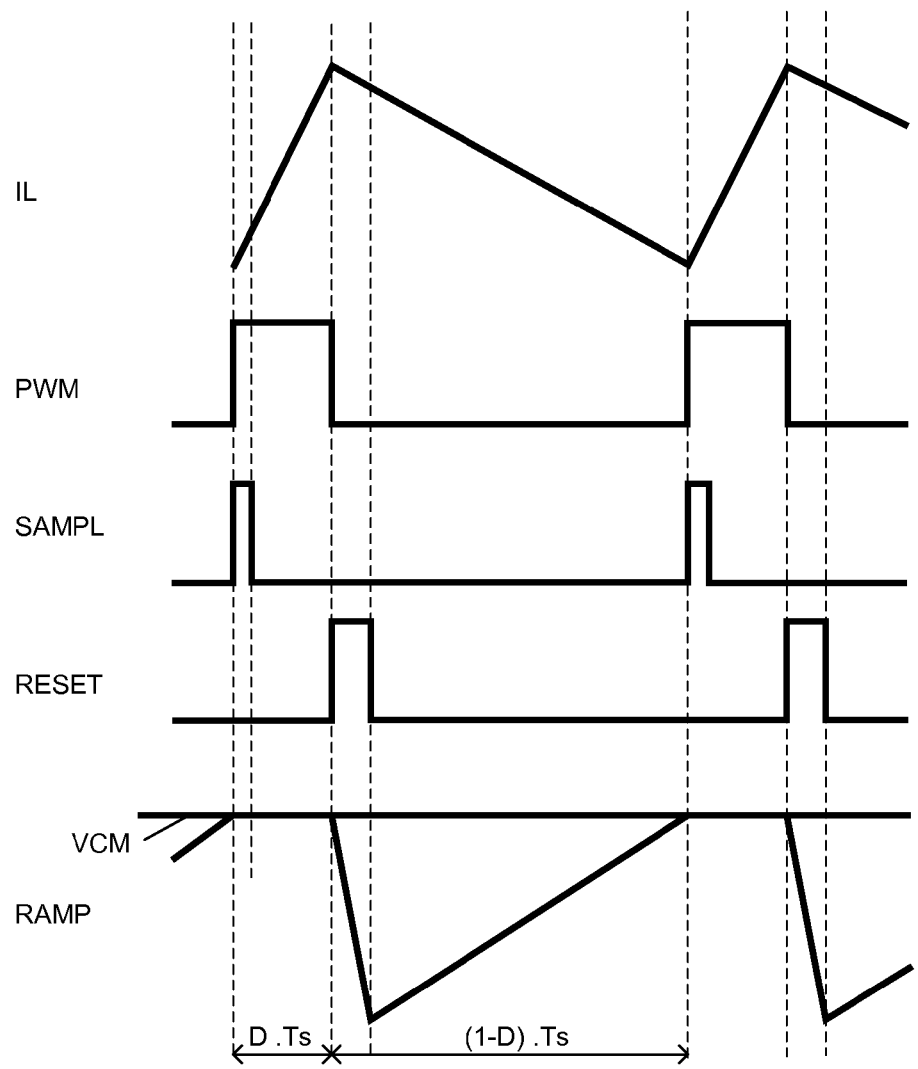
FIG. 5 illustrates waveforms of the ramp generator 203B shown in FIG. 4 during CCM in accordance with an embodiment of the present invention.

As shown in FIG. 5, when the control signal PWM is changed from logical high into logical low, the transistor M19 is turned on and the one-shot circuit 332A is triggered to generate a pulse. The transistor M3 is turned on for a first predetermined time period to discharge the capacitor C1 through the resistor R1. The ramp signal RAMP decreases. After the first predetermined time period, the transistor M3 is turned off. The capacitor C1 is charged by the current Iramp provided by the controllable current source 333B and the ramp signal RAMP increases.

When the control signal PWM is changed from logical low into logical high, the transistor M19 is turned off and the one-shot circuit 4311 is triggered to generate a pulse. The transistors M4 and M7 are turned on for a second predetermined time period. If the ramp signal RAMP is larger than the common mode voltage VCM, the transistor M5 will be turned off and the transistor M6 will be turned on. The capacitor C2 will be discharged by the current source IS2, the current control signal CCS as well as the voltage across the capacitor C2 will decrease to reduce the current Iramp. If the ramp signal RAMP is smaller than the common mode voltage VCM, the transistor M5 will be turned on and the transistor M6 will be turned off. The capacitor C2 will be charged by the current source IS1, the current control signal CCS as well as the voltage across the capacitor C2 will increase to increase the current Iramp. After the second predetermined time period set by the one-shot circuit 4311, the transistors M4 and M7 are turned off.

The maximum level of the ramp signal RAMP is limited by the clamp circuit 334B. If the ramp signal RAMP is larger than the clamping voltage VCLAMP which is a sum of the common mode voltage VCM and the voltage provided by the voltage source VS1, the on-resistance of the transistor M8 will be adjusted by the amplifier AMP1 to regulate the level of the ramp signal RAMP to be equal to the clamping voltage VCLAMP.

Figure 6:
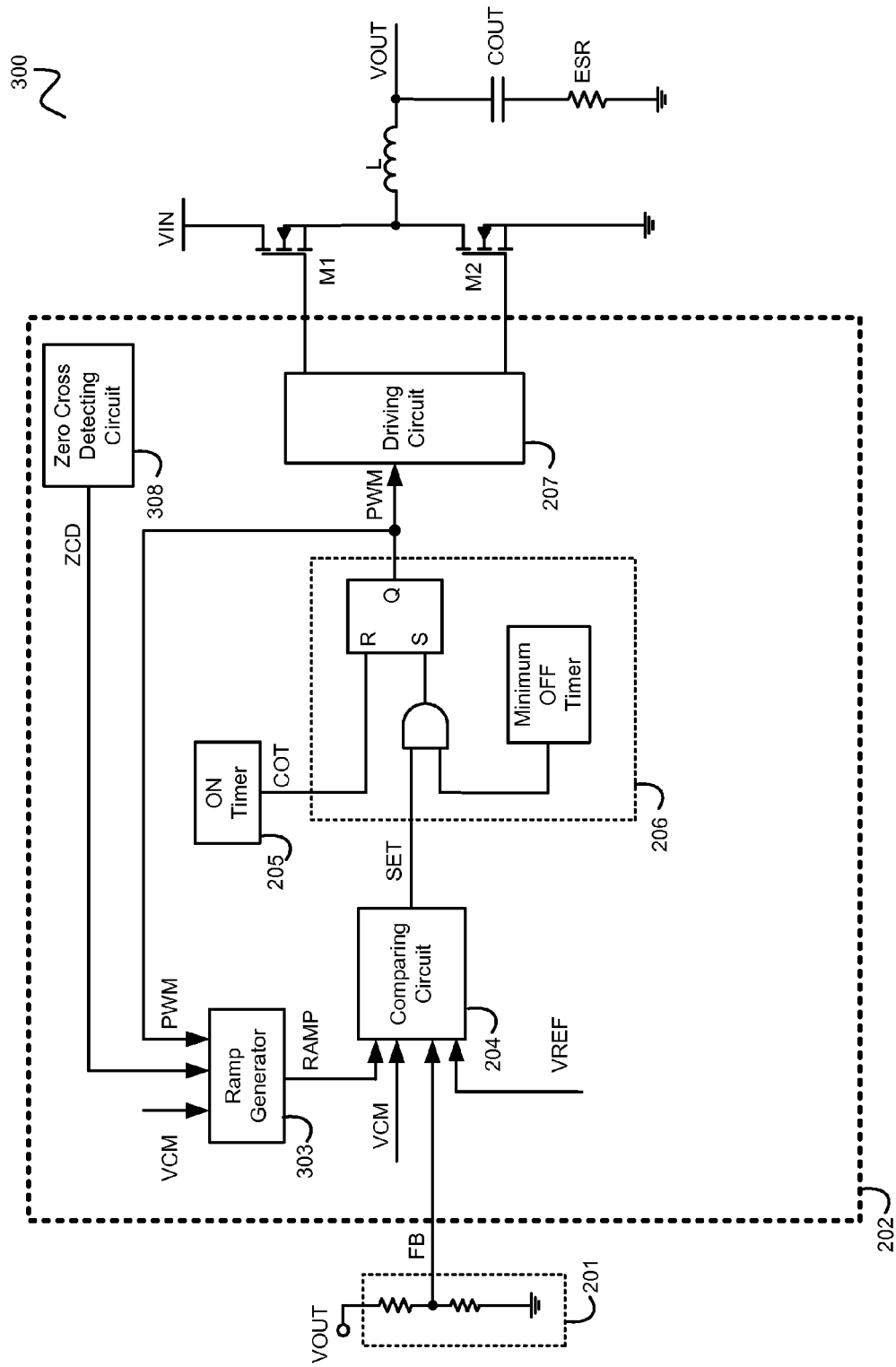
FIG. 6 is a block diagram of a switching converter 300 in accordance with an embodiment of the present invention.

FIG. 6 is a block diagram of a switching converter 300 in accordance with an embodiment of the present invention. Compared with the switching converter 200 shown in FIG. 2, the switching converter 300 further comprises a zero cross detecting circuit 308. The zero cross detecting circuit 308 is configured to detect zero cross of the current flowing through the inductor L (e.g. in discontinuous current mode or skip mode) and generate a zero cross detection signal ZCD. The ramp generator 303 is configured to generate the ramp signal RAMP based on the zero cross detection signal ZCD, the common mode VCM and the control signal PWM. The level of the ramp signal RAMP is regulated to be equal to the level of the common mode voltage VCM when the status of the main transistor M1 is changed from OFF to ON or the zero cross of the inductor current is detected.

Figure 7:
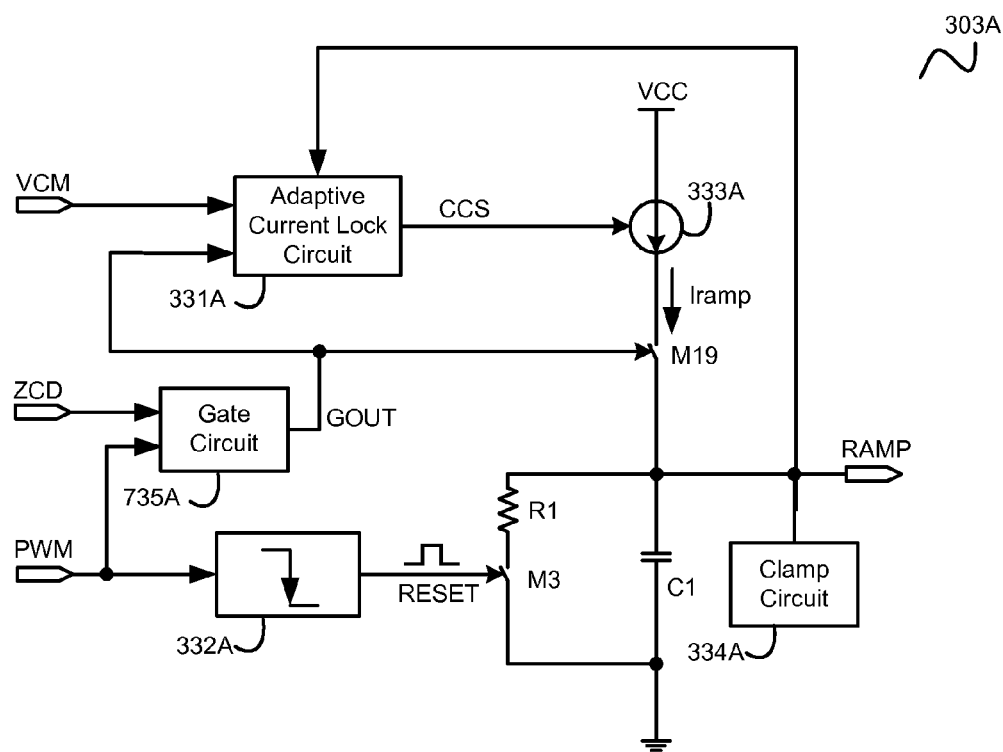
FIG. 7 schematically illustrates a ramp generator 303A in accordance with an embodiment of the present invention.

FIG. 7 schematically illustrates a ramp generator 303A in accordance with an embodiment of the present invention. Compared with the ramp generator 203A shown in FIG. 3, the ramp generator 303A further comprises a gate circuit 735A. The gate circuit 735A has a first input terminal, a second input terminal and an output terminal, wherein the first input terminal is coupled to the zero cross detecting circuit to receive the zero cross detection signal ZCD, the second input terminal is coupled to the logic circuit to receive the control signal PWM, the output terminal is coupled to the second input terminal of the adaptive current lock circuit 331A and the control terminal of the transistor M19. Based on the zero cross detection signal ZCD and the control signal PWM, the gate circuit 735A generates a gate output signal GOUT at the output terminal. The adaptive current lock circuit 331A generates the current control signal CCS based on the common mode voltage VCM, the ramp signal RAMP and the gate output signal GOUT. The current provided by the controllable current source 333A is adjusted by the adaptive current lock circuit 331A, so as to regulate the level of the ramp signal RAMP to be equal to the level of the common mode voltage VCM when the status of the main transistor M1 is changed from OFF to ON or the zero cross of the inductor current is detected.

Figure 8:
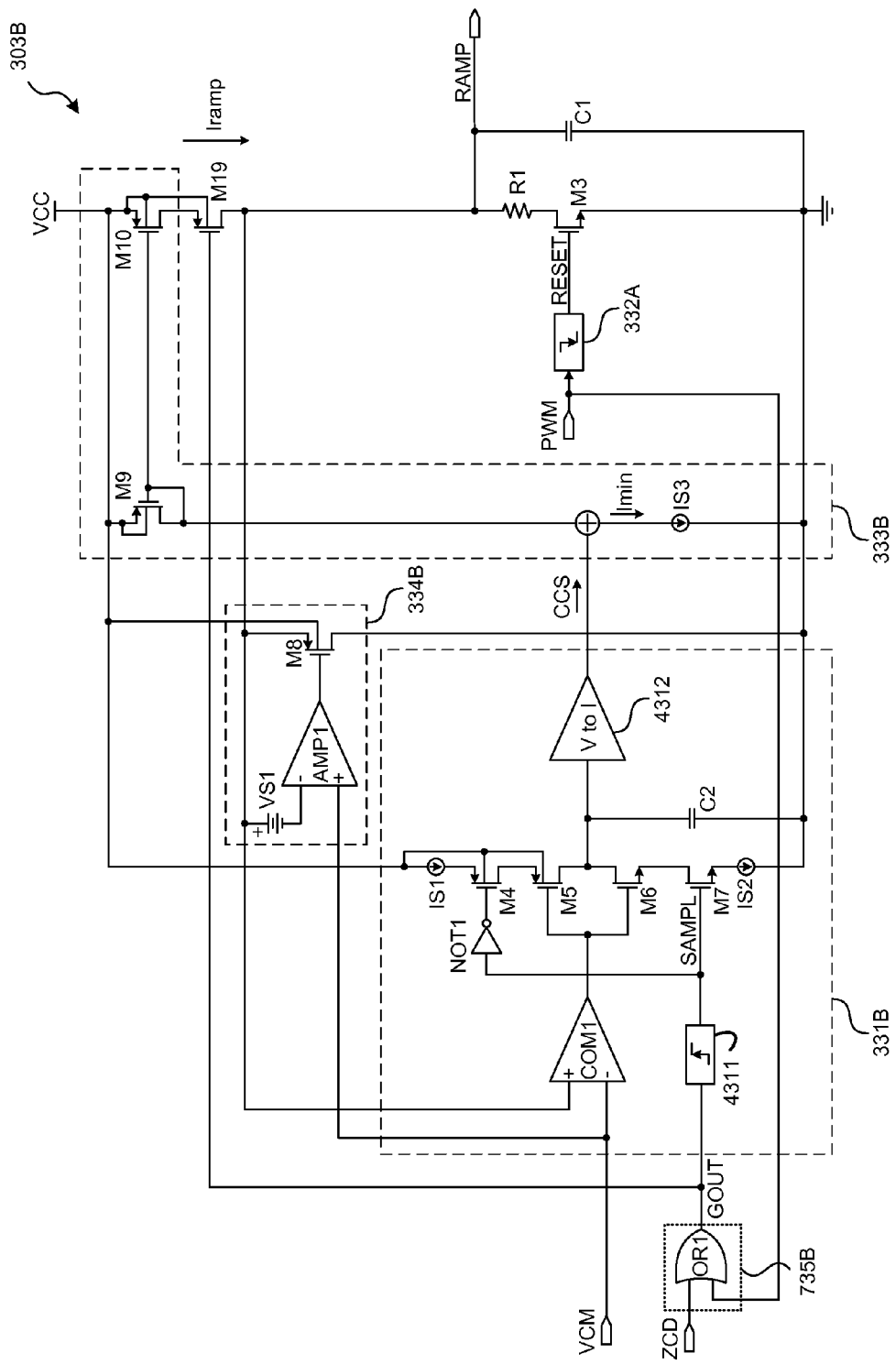
FIG. 8 schematically illustrates a ramp generator 303B in accordance with an embodiment of the present invention.

FIG. 8 schematically illustrates a ramp generator 303B in accordance with an embodiment of the present invention. The gate circuit 735B shown in FIG. 8 comprises an OR gate OR1 having a first input terminal, a second input terminal and an output terminal, wherein the first input terminal is coupled to the zero cross detecting circuit to receive the zero cross detection signal ZCD, the second input terminal is coupled to the logic circuit to receive the control signal PWM, the output terminal is coupled to the input terminal of the one-shot circuit 4311 and the control terminal of the transistor M19.

When the control signal PWM or the zero cross detection signal ZCD is changed from logical low into logical high, the one-shot circuit 4311 is triggered to turn on the transistors M4 and M7 for the second predetermined time period, so the current control signal CCS can be adjusted to regulate the ramp signal RAMP.

The transistor M19 is included in the ramp generators shown in FIGS. 3, 4, 7 and 8. However, it should be noted that, the transistor M19 is not necessary and may be omitted. All of these variations are within the scope of the invention and do not depart from the spirit of the invention.

Figure 9:
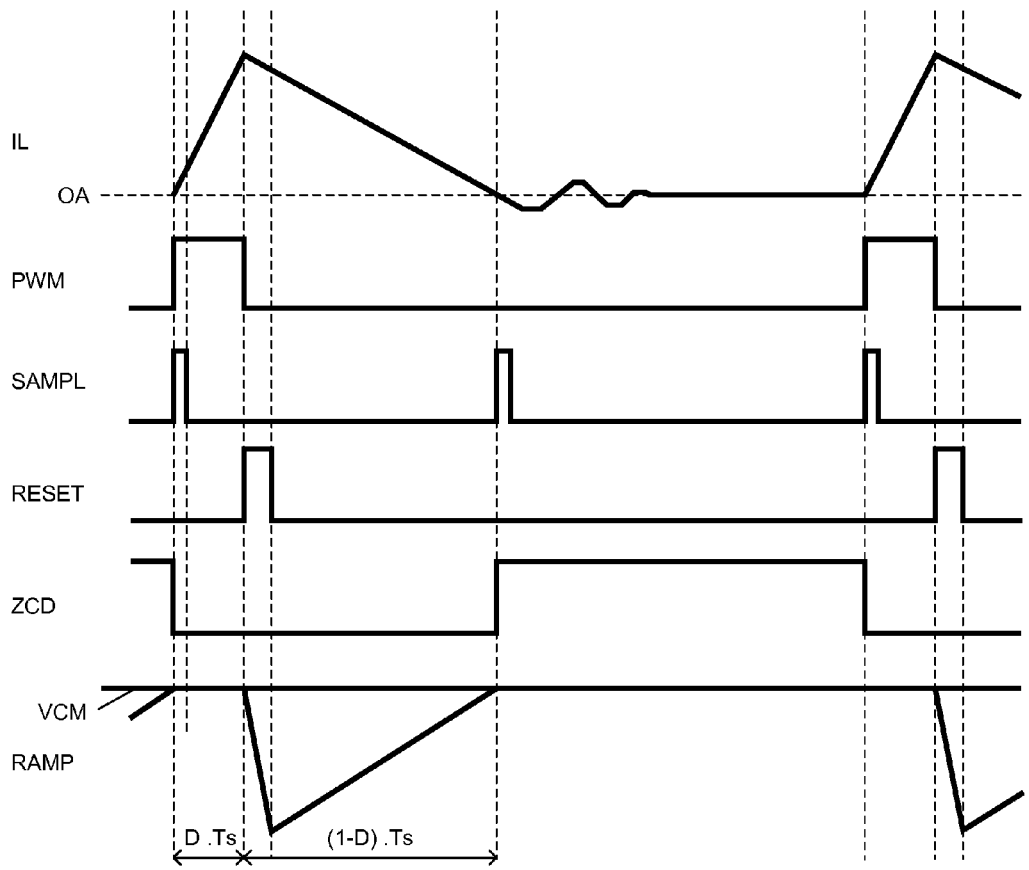
FIG. 9 illustrates waveforms of the ramp generator 303B during DCM in accordance with an embodiment of the present invention.

FIG. 9 illustrates waveforms of the ramp generator 303B during discontinuous current mode (DCM) in accordance with an embodiment of the present invention. As shown in FIG. 9, the level of the ramp signal RAMP is regulated to be equal to the level of the common mode voltage VCM when the signal SAMPL is logical high. The ramp signal RAMP is maintained when the main transistor is ON (PWM="1") or when the freewheel transistor is OFF during the inductor current is zero (ZCD="1").

Figure 10:
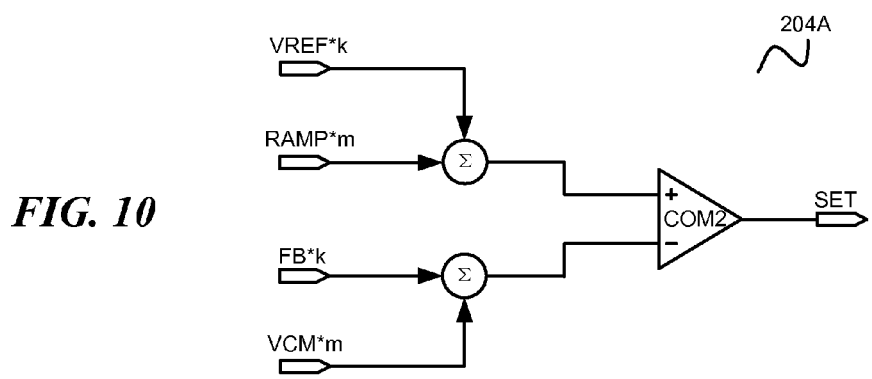
FIG. 10 schematically illustrates a comparing circuit 204A in accordance with an embodiment of the present invention.

FIG. 10 schematically illustrates a comparing circuit 204A in accordance with an embodiment of the present invention. The comparing circuit 204A comprises a comparator COM2 having a non-inverting input terminal, a inverting input terminal and an output terminal, wherein the non-inverting input terminal is configured to receive the sum of the reference signal VREF and the ramp signal RAMP, the inverting input terminal is configured to receive the sum of the feedback signal FB and the common mode voltage VCM, and the output terminal is configured to provide the comparison signal SET.

In some embodiments, to make the switching converter more stable, the signals are multiplied by some coefficients before sent into the comparator COM2. As shown in FIG. 10, the reference signal VREF and the feedback signal FB are multiplied by a coefficient k, the ramp signal RAMP and the common mode voltage VCM are multiplied by a coefficient m which is smaller than k.

Figure 11:
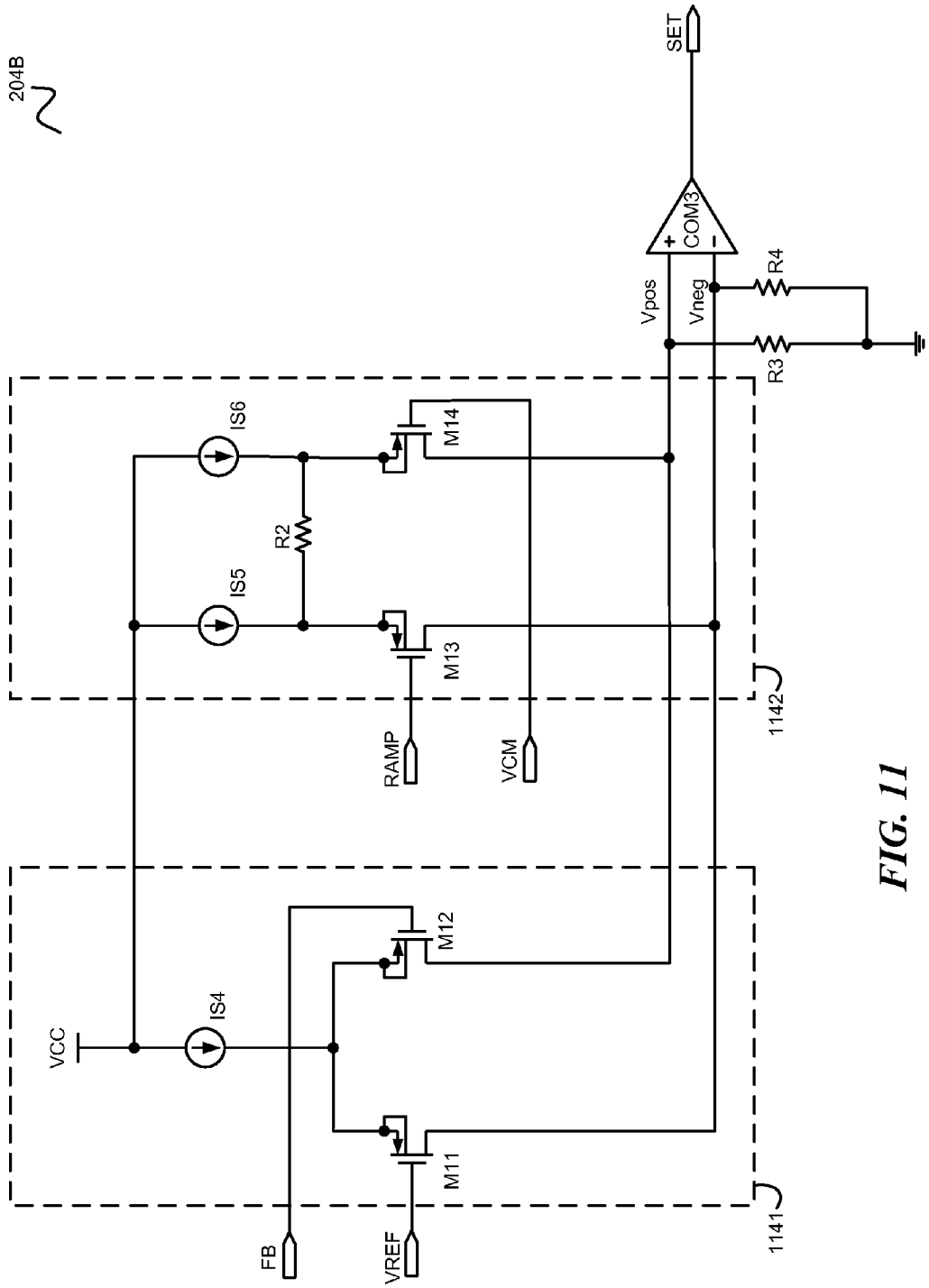
FIG. 11 schematically illustrates a comparing circuit 204B in accordance with an embodiment of the present invention.

FIG. 11 schematically illustrates a comparing circuit 204B in accordance with an embodiment of the present invention. The comparing circuit 204B comprises a feedback sensing circuit 1141, a compensation circuit 1142, a comparator COM3 and resistors R3, R4. The feedback sensing circuit 1141 comprises a current source IS4 and transistors M11 and M12. The current source IS4 has a first terminal and a second terminal, wherein the first terminal is configured to receive the power supply voltage VCC. The transistor M11 has a first terminal, a second terminal and a control terminal, wherein the first terminal is coupled to the second terminal of the current source IS4, the control terminal is configured to receive the reference signal VREF. The transistor M12 has a first terminal, a second terminal and a control terminal, wherein the first terminal is coupled to the second terminal of the current source IS4, the control terminal is coupled to the feedback circuit to receive the feedback signal FB.

The compensation circuit 1142 comprises current sources IS5, IS6, a resistor R2 and transistors M13, M14. The current source IS5 has a first terminal and a second terminal, wherein the first terminal is configured to receive the power supply voltage VCC. The current source IS6 has a first terminal and a second terminal, wherein the first terminal is configured to receive the power supply voltage VCC. The resistor R2 has a first terminal and a second terminal, wherein the first terminal is coupled to the second terminal of the current source IS5, the second terminal is coupled to the second terminal of the current source IS6. The transistor M13 has a first terminal, a second terminal and a control terminal, wherein the first terminal is coupled to the second terminal of the current source IS5, the control terminal is coupled to the ramp generator to receive the ramp signal RAMP. The transistor M14 has a first terminal, a second terminal and a control terminal, wherein the first terminal is coupled to the second terminal of the current source IS6, the control terminal is configured to receive the common mode voltage VCM.

The comparator COM3 has a non-inverting input terminal, a inverting input terminal and an output terminal, wherein the non-inverting input terminal is coupled to the second terminals of the transistors M12 and M14, the inverting input terminal is coupled to the second terminals of the transistor M11 and M13, and the output terminal is configured to provide the comparison signal SET. The resistors R3 has a first terminal and a second terminal, wherein the first terminal is coupled to the non-inverting input terminal of the comparator COM3, the second terminal is coupled to the reference ground. The resistors R4 has a first terminal and a second terminal, wherein the first terminal is coupled to the inverting input terminal of the comparator COM3, the second terminal is coupled to the reference ground.

Figure 12A:
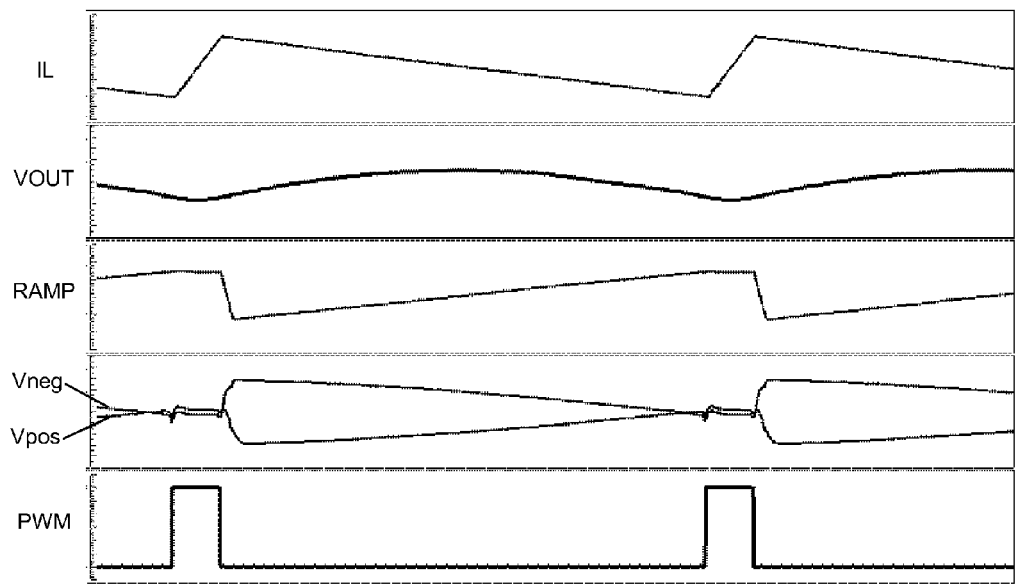
FIG. 12A illustrates waveforms of the comparing circuit 204B during CCM in accordance with an embodiment of the present invention.
Figure 12B:
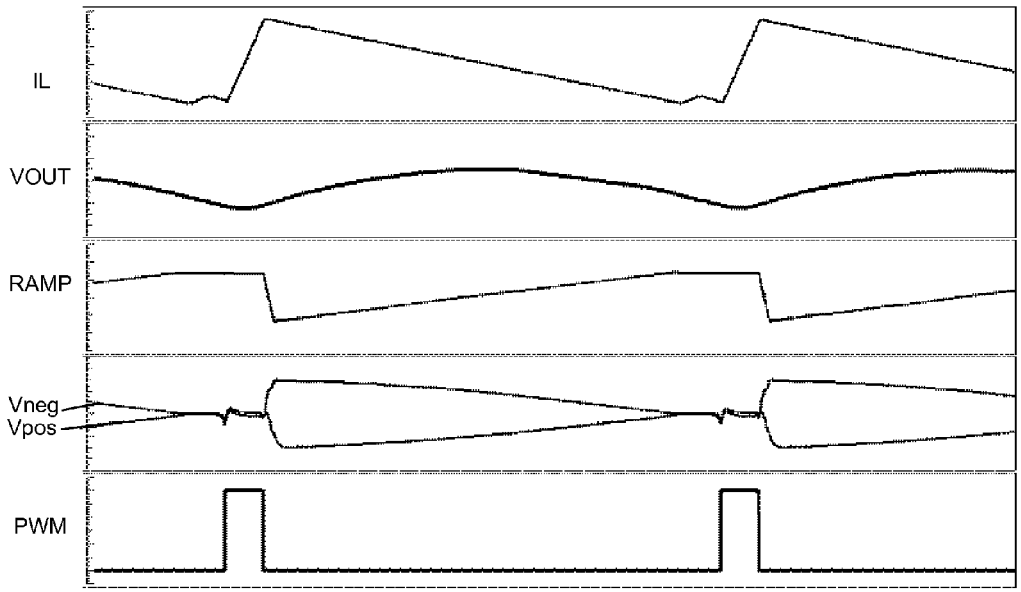
FIG. 12B illustrates waveforms of the comparing circuit 204B during DCM in accordance with an embodiment of the present invention.

FIGS. 12A and 12B respectively illustrates waveforms of the comparing circuit 204B during CCM and DCM in accordance with an embodiment of the present invention, wherein Vpos indicates the voltage at the non-inverting input terminal of the comparator COM3 and Vneg indicates the voltage at the inverting input terminal of the comparator COM3.

Figure 13A:
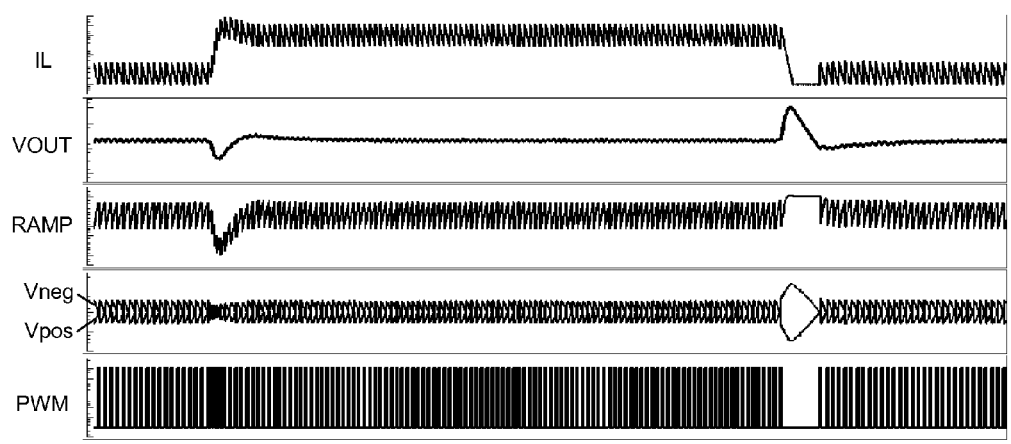
FIGS. 13A-13C illustrate waveforms of the comparing circuit 204B during load transient in accordance with an embodiment of the present invention.
Figure 13B:
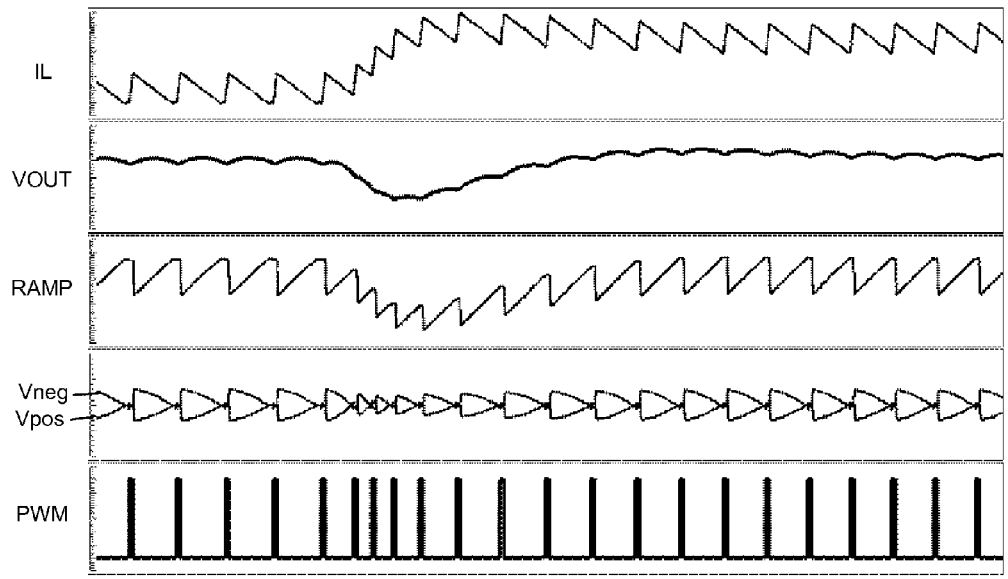
Figure 13C:
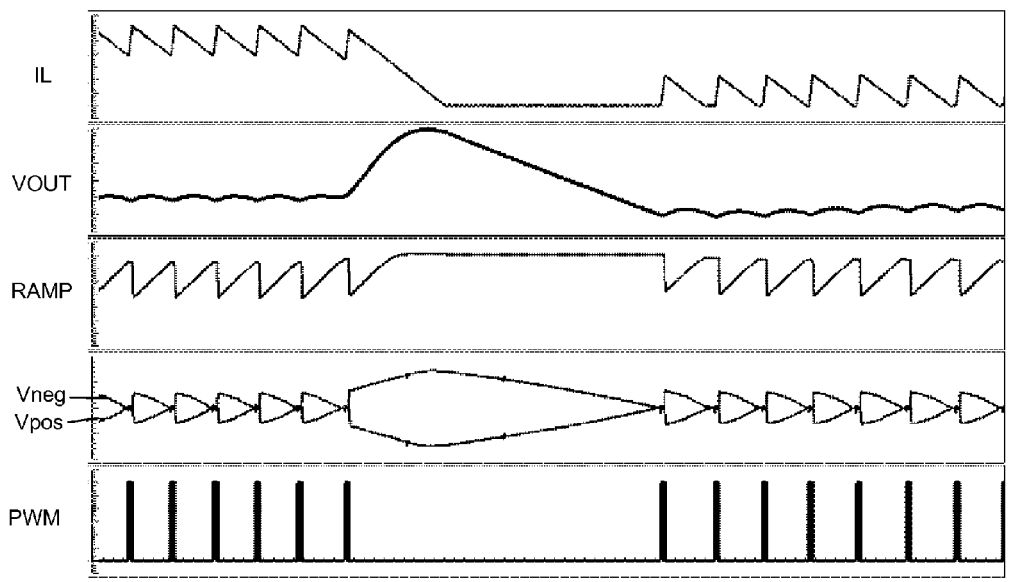

FIGS. 13A~13C illustrate waveforms of the comparing circuit 204B during load transient in accordance with an embodiment of the present invention, wherein FIGS. 13B and 13C are partial enlarged views of FIG. 13A. As shown in the figures, under normal operation, the ramp signal RAMP is discharged when the status of the main transistor is changed from ON to OFF. After then, the ramp signal RAMP is charged to keep increasing until the status of the main transistor is changed into ON. The level of the ramp signal RAMP is regulated to be equal to the level of the common mode voltage VCM at the end of the off time.

When the load steps up, as shown in FIG. 13B, the ramp signal RAMP is pushed down since the off time of the main transistor is reduced. The amplitude of the ramp signal RAMP is also compressed as the ramp signal RAMP drops closer to zero. This is due to a resistor instead of a current source is used to discharge the ramp signal RAMP. Smaller RAMP amplitude gives faster transient response. After load is settling, the ramp signal RAMP goes back to its original amplitude.

When the load steps down, as shown in FIG. 13C, the ramp signal RAMP is pushed up to reach the clamping voltage VCLAMP since the off time of the main transistor is increased.

Figure 14:
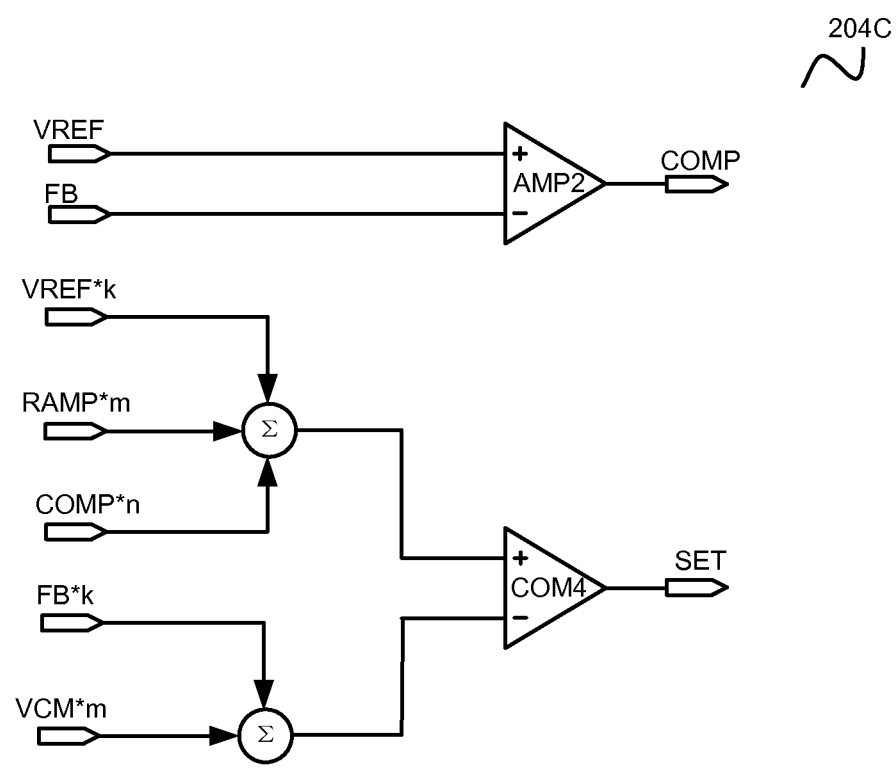
FIG. 14 schematically illustrates a comparing circuit 204C in accordance with an embodiment of the present invention.

FIG. 14 schematically illustrates a comparing circuit 204C in accordance with an embodiment of the present invention. The comparing circuit 204C comprises an error amplifier AMP2 and a comparator COM4. The error amplifier AMP2 has a non-inverting input terminal, an inverting input terminal and an output terminal, wherein the non-inverting input terminal is configured to receive the reference signal VREF, the inverting input terminal is coupled to the feedback circuit to receive the feedback signal FB. Based on the reference signal VREF and the feedback signal FB, the error amplifier AMP2 generates a compensation signal COMP at the output terminal. The comparator COM4 has a non-inverting input terminal, a inverting input terminal and an output terminal, wherein the non-inverting input terminal is configured to receive the sum of the reference signal VREF, the ramp signal RAMP and the compensation signal COMP, the inverting input terminal is configured to receive the sum of the feedback signal FB and the common mode voltage VCM, and the output terminal is configured to provide the comparison signal SET.

In some embodiments, to make the switching converter more stable, the signals are multiplied by some coefficient before sent into the comparator COM4. As shown in FIG. 14, the reference signal VREF and the feedback signal FB are multiplied by the coefficient k, the ramp signal RAMP and the common mode voltage VCM are multiplied by the coefficient m, the compensation signal COMP is multiplied by a coefficient n.

Figure 15:
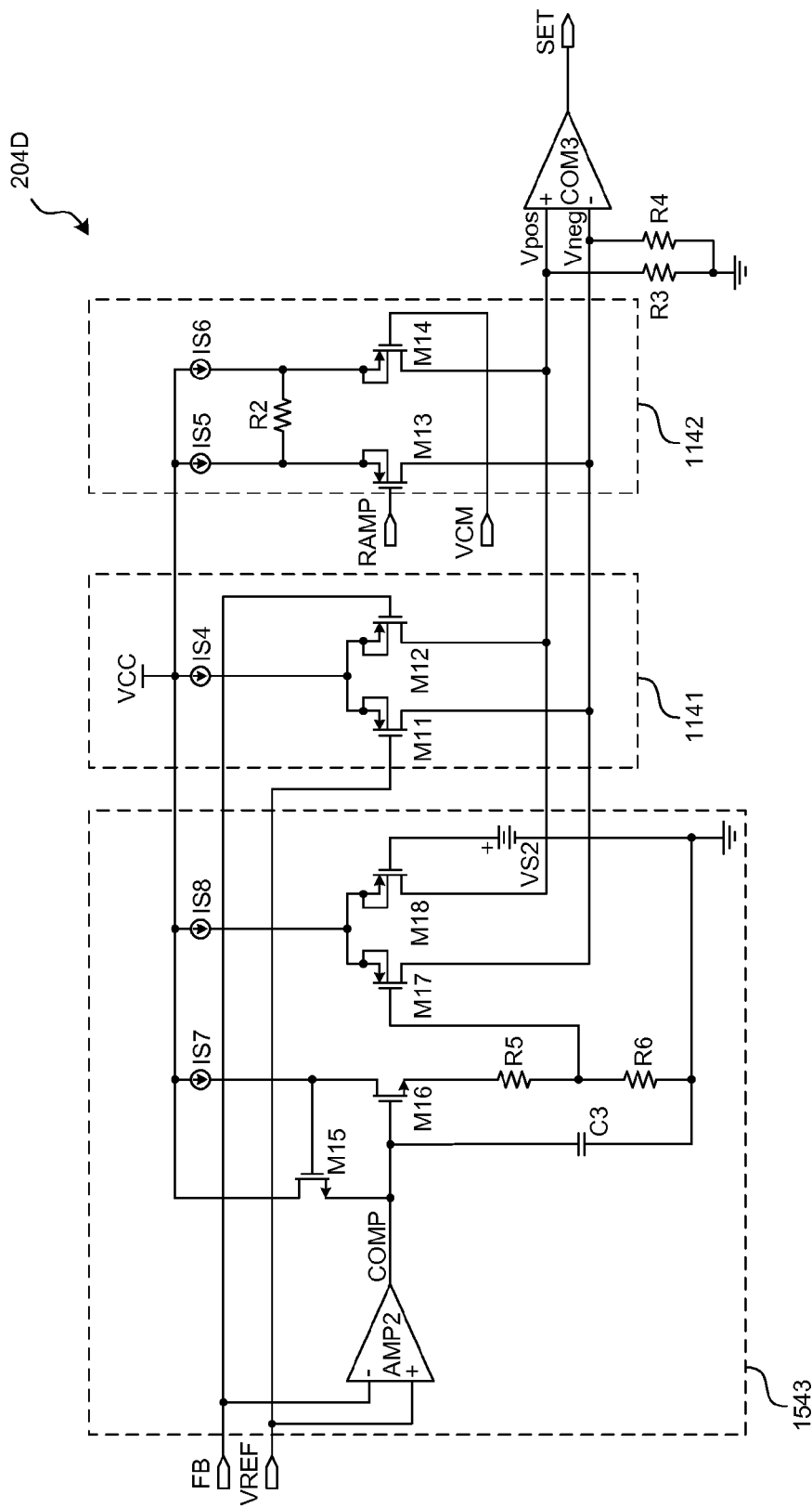
FIG. 15 schematically illustrates a comparing circuit 204D in accordance with an embodiment of the present invention.

FIG. 15 schematically illustrates a comparing circuit 204D in accordance with an embodiment of the present invention. Compared with the comparing circuit 204B shown in FIG. 11, the comparing circuit 204D further comprises a feedback DC sensing circuit 1543 which adopts EA correction to remove the DC error caused by the ramp compensation.

The feedback DC sensing circuit 1543 comprises the error amplifier AMP2, transistors M15~M18, current source IS7, IS8, a capacitor C3, a resistor R5 and a voltage source VS2. The current source IS7 and IS8 both have a first terminal and a second terminal, wherein the first terminals of them are configured to receive the power supply voltage VCC. The transistor M15 has a first terminal, a second terminal and a control terminal, wherein the first terminal is configured to receive the power supply voltage VCC, the second terminal is coupled to the output terminal of the error amplifier AMP2, the control terminal is coupled to the second terminal of the current source IS7. The capacitor C3 has a first terminal and a second terminal, wherein the first terminal is coupled to the output terminal of the error amplifier AMP2, the second terminal is coupled to the reference ground.

The transistor M16 has a first terminal, a second terminal and a control terminal, wherein the first terminal is coupled to the second terminal of the current source IS7, the control terminal is coupled to the output terminal of the error amplifier AMP2 to receive the compensation signal COMP. The resistor R5 has a first terminal and a second terminal, wherein the first terminal is coupled to the second terminal of the transistor M16. The resistor R6 has a first terminal and a second terminal, wherein the first terminal is coupled to the second terminal of the resistor R5, the second terminal is coupled to the reference ground. The transistor M17 has a first terminal, a second terminal and a control terminal, wherein the first terminal is coupled to the second terminal of the current source IS8, the control terminal is coupled to the second terminal of the resistor R5 and the first terminal of the resistor R6, the second terminal is coupled to the inverting input terminal of the comparator COM3. The transistor M18 has a first terminal, a second terminal and a control terminal, wherein the first terminal is coupled to the second terminal of the current source IS8, the second terminal is coupled to the non-inverting input terminal of the comparator COM3. The voltage source VS2 has an anode and a cathode, wherein the anode is coupled to the control terminal of the transistor M18, the cathode is coupled to the reference ground.

The compensation signal COMP generated by the error amplifier AMP2 is attenuated by resistors R5 and R6, so small C3 can be used. The correction range of the compensation signal COMP may be small since the amplitude of the ramp signal RAMP is generally fixed regardless of the input voltage VIN, the output voltage VOUT and the switching frequency. The compensation signal COMP may be designed to near zero and inherently clamped to zero in skip mode. The transistor M15 prevents the compensation signal COMP from going negative in skip mode.

Figure 16:
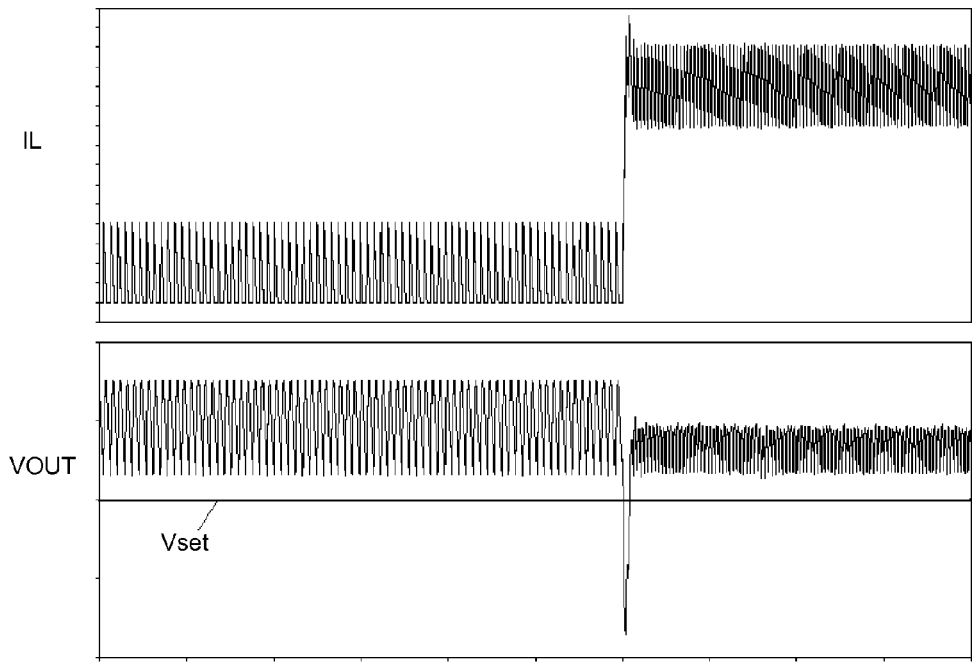
FIG. 16 illustrates waveforms of a switching converter without EA correction in accordance with an embodiment of the present invention.
Figure 17:
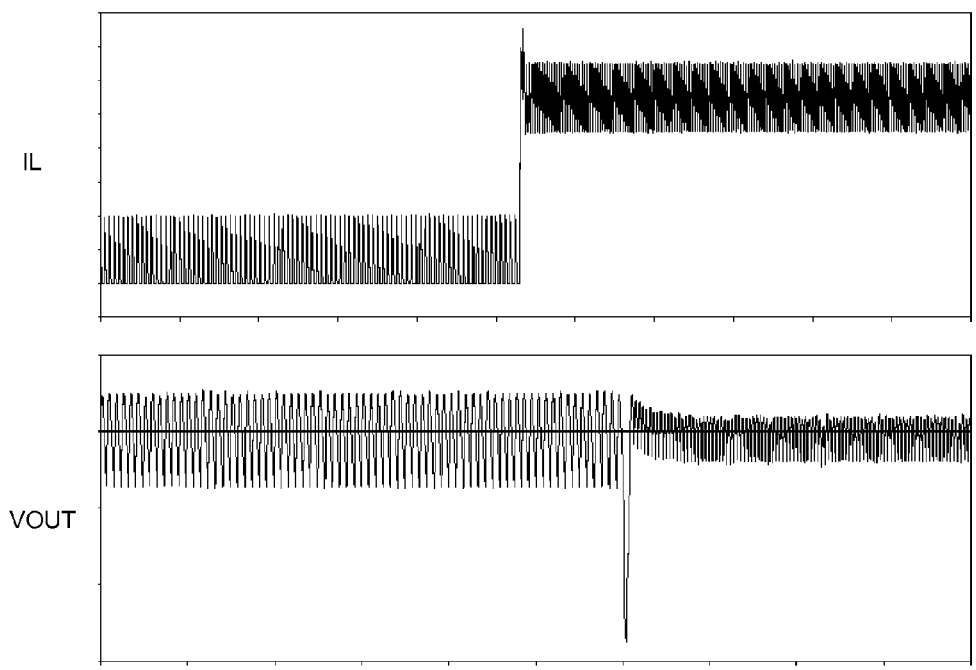
FIG. 17 illustrates waveforms of a switching converter with EA correction in accordance with an embodiment of the present invention.

FIG. 16 illustrates waveforms of a switching converter without EA correction, while FIG. 17 illustrates waveforms of a switching converter with EA correction. Comparing these two figures, we can get that the DC error of the output voltage Vout is eliminated through EA correction.

Figure 18:
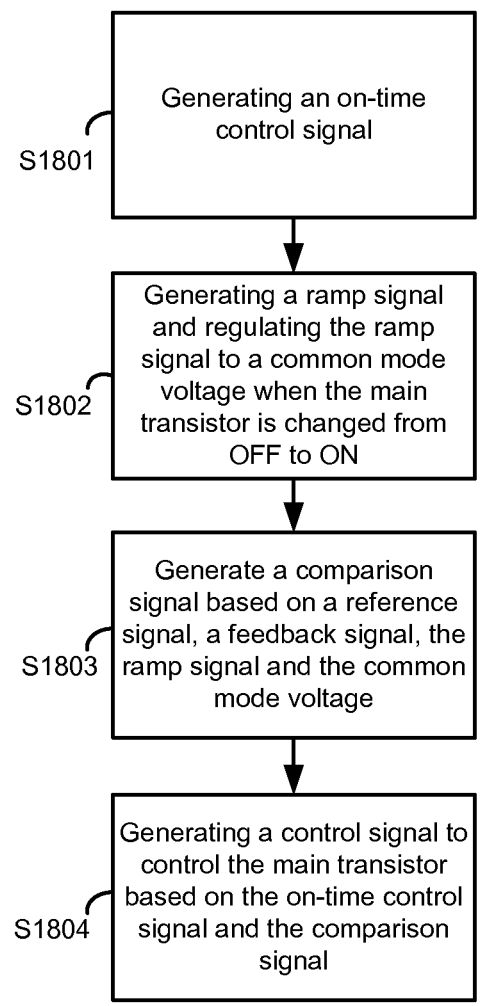
FIG. 18 is a flow chart of a control method used in a switching converter, in accordance with an embodiment of the present invention.

FIG. 18 is a flow chart of a control method used in a switching converter, in accordance with an embodiment of the present invention. The control method comprises steps S1801~S1804.

At step S1801, an on-time control signal is generated.

At step S1802, a ramp signal is generated and the level of the ramp signal is regulated to be equal to the level of a common mode voltage when the status of the main transistor is changed from OFF to ON.

At step S1803, a comparison signal is generated based on the ramp signal, the common mode voltage, a reference signal and a feedback signal indicative of the output voltage.

At step S1804, a control signal is generated to control the main transistor based on the on-time control signal and the comparison signal.

In some embodiments, the control method further comprises: detecting a zero cross of the current flowing through the inductor; and regulating the level of the ramp signal to be equal to the level of a common mode voltage when the zero cross of the inductor current is detected.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

We claim:

1. A controller used in a switching converter, wherein the switching converter comprises a main transistor and an inductor coupled to the main transistor, and is configured to provide an output voltage, the controller comprises:
    an on timer configured to generate an on-time control signal;
    a ramp generator configured to generate a ramp signal;
    a comparing circuit coupled to the ramp generator, wherein the comparing circuit generates a comparison signal based on the ramp signal, a common mode voltage, a reference signal and a feedback signal indicative of the output voltage; and
    a logic circuit coupled to the on timer and the comparing circuit, wherein based on the on-time control signal and the comparison signal, the logic circuit generates a control signal to control the main transistor; wherein
    the ramp generator comprises:
        an adaptive current lock circuit having a first input terminal, a second input terminal, a third input terminal and an output terminal, wherein the first input terminal is configured to receive the common mode voltage, the second input terminal is coupled to the logic circuit to receive the control signal, the third input terminal is configured to receive the ramp signal, and wherein based on the common mode voltage, the control signal and the ramp signal, the adaptive current lock circuit generates a current control signal at the output terminal;
        a first one-shot circuit having an input terminal and an output terminal, wherein the input terminal is coupled to the logic circuit to receive the control signal;
        a controllable current source having a first terminal, a second terminal and a control terminal, wherein the first terminal is configured to receive a power supply voltage, the control terminal is coupled to the output terminal of the adaptive current lock circuit to receive the current control signal;
        a first capacitor having a first terminal and a second terminal, wherein the first terminal is coupled to the second terminal of the controllable current source and is configured to provide the ramp signal, the second terminal is coupled to a reference ground;

a first resistor having a first terminal and a second terminal, wherein the first terminal is coupled to the first terminal of the first capacitor; and a first transistor having a first terminal, a second terminal and a control terminal, wherein the first terminal is coupled to the second terminal of the first resistor, the second terminal is coupled to the reference ground, and the control terminal is coupled to the output terminal of the first one-shot circuit.

2. The controller of claim 1, further comprising:
a zero cross detecting circuit configured to detect a zero cross of the current flowing through the inductor and provide a zero cross detection signal; wherein
the ramp generator further comprises a gate circuit having a first input terminal, a second input terminal and an output terminal, wherein the first input terminal is coupled to the zero cross detecting circuit to receive the zero cross detection signal, the second input terminal is coupled to the logic circuit to receive the control signal, the output terminal is coupled to the second input terminal of the adaptive current lock circuit.

3. The controller of claim 1, wherein the ramp generator further comprises a clamp circuit coupled to the first terminal of the first capacitor, and wherein the clamp circuit is configured to limit the maximum level of the ramp signal to a clamping voltage.

4. The controller of claim 1, wherein the adaptive current lock circuit comprises:
a first comparator having a first input terminal, a second input terminal and an output terminal, wherein the first input terminal is coupled to the first terminal of the first capacitor to receive the ramp signal, the second input terminal is configured to receive the common mode voltage;
a second one-shot circuit having an input terminal and an output terminal, wherein the input terminal is coupled to the logic circuit to receive the control signal;
a NOT gate having an input terminal and an output terminal, wherein the input terminal is coupled to the output terminal of the second one-shot circuit;
a first current source having a first terminal and a second terminal, wherein the first terminal is configured to receive the power supply voltage;
a second transistor having a first terminal, a second terminal and a control terminal, wherein the first terminal is coupled to the second terminal of the first current source, the control terminal is coupled to the output terminal of the NOT gate;
a third transistor having a first terminal, a second terminal and a control terminal, wherein the first terminal is coupled to the second terminal of the second transistor, the control terminal is coupled to the output terminal of the first comparator;
a fourth transistor having a first terminal, a second terminal and a control terminal, wherein the first terminal is coupled to the second terminal of the third transistor, the control terminal is coupled to the output terminal of the first comparator;
a fifth transistor having a first terminal, a second terminal and a control terminal, wherein the first terminal is coupled to the second terminal of the fourth transistor, the control terminal is coupled to the output terminal of the second one-shot circuit;
a second current source having a first terminal and a second terminal, wherein the first terminal is configured to the second terminal of the fifth transistor, the second terminal is coupled to the reference ground;
a second capacitor having a first terminal and a second terminal, wherein the first terminal is coupled to the second terminal of the third transistor and the first terminal of the fourth transistor, the second terminal is coupled to the reference ground; and
a voltage to current converter having an input terminal and an output terminal, wherein the input terminal is coupled to the first terminal of the second capacitor, and wherein based on the voltage across the second capacitor, the voltage to current converter generates the current control signal at the output terminal.

5. The controller of claim 4, wherein the ramp generator further comprises a clamp circuit including:
a voltage source having an anode and a cathode, wherein the anode is coupled to the first terminal of the first capacitor to receive the ramp signal;
an error amplifier having a first input terminal, a second input terminal and an output terminal, wherein the first input terminal is configured to receive the common mode voltage, the second input terminal is coupled to the cathode of the voltage source; and
a sixth transistor having a first terminal, a second terminal and a control terminal, wherein the first terminal is coupled to the first terminal of the first capacitor, the second terminal is coupled to the reference ground, the control terminal is coupled to the output terminal of the error amplifier.

6. The controller of claim 1, wherein the comparing circuit comprises:
a third current source having a first terminal and a second terminal, wherein the first terminal is configured to receive the power supply voltage;
a seventh transistor having a first terminal, a second terminal and a control terminal, wherein the first terminal is coupled to the second terminal of the third current source, the control terminal is configured to receive the reference signal;
an eighth transistor having a first terminal, a second terminal and a control terminal, wherein the first terminal is coupled to the second terminal of the third current source, the control terminal is configured to receive the feedback signal;
a fourth current source having a first terminal and a second terminal, wherein the first terminal is configured to receive the power supply voltage;
a fifth current source having a first terminal and a second terminal, wherein the first terminal is configured to receive the power supply voltage;
a second resistor having a first terminal and a second terminal, wherein the first terminal is coupled to the second terminal of the fourth current source, the second terminal is coupled to the second terminal of the fifth current source;
a ninth transistor having a first terminal, a second terminal and a control terminal, wherein the first terminal is coupled to the second terminal of the fourth current source, the control terminal is coupled to the first terminal of the first capacitor to receive the ramp signal;
a tenth transistor having a first terminal, a second terminal and a control terminal, wherein the first terminal is coupled to the second terminal of the fifth current source, the control terminal is configured to receive the common mode voltage;
a second comparator having a first input terminal, a second input terminal and an output terminal, wherein the first input terminal is coupled to the second terminals of the eighth transistor and the tenth transistor, the second input terminal is coupled to the second terminals of the seventh transistor and the ninth transistor;

a third resistor having a first terminal and a second terminal, wherein the first terminal is coupled to the first input terminal of the comparator, the second terminal is coupled to the reference ground; and a fourth resistor having a first terminal and a second terminal, wherein the first terminal is coupled to the second input terminal of the comparator, the second terminal is coupled to the reference ground.

7. The controller of claim 1, wherein the ramp generator further comprises a eleventh transistor having a first terminal, a second terminal and a control terminal, wherein the first terminal is coupled to the second terminal of the controllable current source, the second terminal is coupled to the first terminal of the first capacitor, the control terminal is coupled to the second input terminal of the adaptive current logic circuit.

8. A switching converter configured to provide an output voltage, comprising:
a main transistor;
an inductor coupled to the main transistor;
a feedback circuit configured to generate a feedback signal indicative of the output voltage; and
a controller configured to generate a control signal to control the main transistor; wherein
the controller comprises:
an on timer configured to generate an on-time control signal;
a ramp generator configured to generate a ramp signal, wherein the level of the ramp signal is regulated to be equal to the level of a common mode voltage when the status of the main transistor is changed from OFF to ON;
a comparing circuit coupled to the feedback circuit and the ramp generator, wherein the comparing circuit generates a comparison signal based on the ramp signal, the common mode voltage, a reference signal and the feedback signal; and
a logic circuit coupled to the on timer and the comparing circuit, wherein the logic circuit generates the control signal based on the on-time control signal and the comparison signal.

9. The switching converter of claim 8, wherein the controller further comprises:
a zero cross detecting circuit configured to detect a zero cross of the current flowing through the inductor and provide a zero cross detection signal to the ramp generator; wherein
the level of the ramp signal is regulated to be equal to the level of a common mode voltage when the zero cross of the inductor current is detected.

10. The switching converter of claim 8, wherein the ramp generator comprises:
an adaptive current lock circuit having a first input terminal, a second input terminal, a third input terminal and an output terminal, wherein the first input terminal is configured to receive the common mode voltage, the second input terminal is coupled to the logic circuit to receive the control signal, the third input terminal is configured to receive the ramp signal, and wherein based on the common mode voltage, the control signal and the ramp signal, the adaptive current lock circuit generates a current control signal at the output terminal;

a first one-shot circuit having an input terminal and an output terminal, wherein the input terminal is coupled to the logic circuit to receive the control signal;
a controllable current source having a first terminal, a second terminal and a control terminal, wherein the first terminal is configured to receive a power supply voltage, the control terminal is coupled to the output terminal of the adaptive current lock circuit to receive the current control signal;
a first capacitor having a first terminal and a second terminal, wherein the first terminal is coupled to the second terminal of the controllable current source and is configured to provide the ramp signal, the second terminal is coupled to a reference ground;
a first resistor having a first terminal and a second terminal, wherein the first terminal is coupled to the first terminal of the first capacitor; and
a first transistor having a first terminal, a second terminal and a control terminal, wherein the first terminal is coupled to the second terminal of the first resistor, the second terminal is coupled to the reference ground, and the control terminal is coupled to the output terminal of the first one-shot circuit.

11. The switching converter of claim 10, wherein the controller further comprises a zero cross detecting circuit configured to detect the zero cross of the current flowing through the inductor and provide a zero cross detection signal, and wherein the ramp generator further comprises a gate circuit having a first input terminal, a second input terminal and an output terminal, wherein the first input terminal is coupled to the zero cross detecting circuit to receive the zero cross detection signal, the second input terminal is coupled to the logic circuit to receive the control signal, the output terminal is coupled to the second input terminal of the adaptive current lock circuit.

12. The switching converter of claim 10, wherein the ramp generator further comprises a clamp circuit coupled to the first terminal of the first capacitor, and wherein the clamp circuit is configured to limit the maximum level of the ramp signal to a clamping voltage.

13. The switching converter of claim 10, wherein the adaptive current lock circuit comprises:
a first comparator having a first input terminal, a second input terminal and an output terminal, wherein the first input terminal is coupled to the first terminal of the first capacitor to receive the ramp signal, the second input terminal is configured to receive the common mode voltage;
a second one-shot circuit having an input terminal and an output terminal, wherein the input terminal is coupled to the logic circuit to receive the control signal;
a NOT gate having an input terminal and an output terminal, wherein the input terminal is coupled to the output terminal of the second one-shot circuit;
a first current source having a first terminal and a second terminal, wherein the first terminal is configured to receive the power supply voltage;
a second transistor having a first terminal, a second terminal and a control terminal, wherein the first terminal is coupled to the second terminal of the first current source, the control terminal is coupled to the output terminal of the NOT gate;
a third transistor having a first terminal, a second terminal and a control terminal, wherein the first terminal is coupled to the second terminal of the second transistor, the control terminal is coupled to the output terminal of the first comparator;

a fourth transistor having a first terminal, a second terminal and a control terminal, wherein the first terminal is coupled to the second terminal of the third transistor, the control terminal is coupled to the output terminal of the first comparator;

a fifth transistor having a first terminal, a second terminal and a control terminal, wherein the first terminal is coupled to the second terminal of the fourth transistor, the control terminal is coupled to the output terminal of the second one-shot circuit;

a second current source having a first terminal and a second terminal, wherein the first terminal is configured to the second terminal of the fifth transistor, the second terminal is coupled to the reference ground;

a second capacitor having a first terminal and a second terminal, wherein the first terminal is coupled to the second terminal of the third transistor and the first terminal of the fourth transistor, the second terminal is coupled to the reference ground; and a voltage to current converter having an input terminal and an output terminal, wherein the input terminal is coupled to the first terminal of the second capacitor, and wherein based on the voltage across the second capacitor, the voltage to current converter generates the current control signal at the output terminal.

14. The switching converter of claim 10, wherein the ramp generator further comprises a clamp circuit including:

a voltage source having an anode and a cathode, wherein the anode is coupled to the first terminal of the first capacitor to receive the ramp signal;

an error amplifier having a first input terminal, a second input terminal and an output terminal, wherein the first input terminal is configured to receive the common mode voltage, the second input terminal is coupled to the cathode of the voltage source; and a sixth transistor having a first terminal, a second terminal and a control terminal, wherein the first terminal is coupled to the first terminal of the first capacitor, the second terminal is coupled to the reference ground, the control terminal is coupled to the output terminal of the error amplifier.

15. The switching converter of claim 8, wherein the comparing circuit comprises:

a third current source having a first terminal and a second terminal, wherein the first terminal is configured to receive the power supply voltage;

a seventh transistor having a first terminal, a second terminal and a control terminal, wherein the first terminal is coupled to the second terminal of the third current source, the control terminal is configured to receive the reference signal;

an eighth transistor having a first terminal, a second terminal and a control terminal, wherein the first terminal is coupled to the second terminal of the third current source, the control terminal is configured to receive the feedback signal;

a fourth current source having a first terminal and a second terminal, wherein the first terminal is configured to receive the power supply voltage;

a fifth current source having a first terminal and a second terminal, wherein the first terminal is configured to receive the power supply voltage;

a second resistor having a first terminal and a second terminal, wherein the first terminal is coupled to the second terminal of the fourth current source, the second terminal is coupled to the second terminal of the fifth current source;

a ninth transistor having a first terminal, a second terminal and a control terminal, wherein the first terminal is coupled to the second terminal of the fourth current source, the control terminal is coupled to the ramp generator to receive the ramp signal;

a tenth transistor having a first terminal, a second terminal and a control terminal, wherein the first terminal is coupled to the second terminal of the fifth current source, the control terminal is configured to receive the common mode voltage;

a second comparator having a first input terminal, a second input terminal and an output terminal, wherein the first input terminal is coupled to the second terminals of the eighth transistor and the tenth transistor, the second input terminal is coupled to the second terminals of the seventh transistor and the ninth transistor;

a third resistor having a first terminal and a second terminal, wherein the first terminal is coupled to the first input terminal of the comparator, the second terminal is coupled to the reference ground; and a fourth resistor having a first terminal and a second terminal, wherein the first terminal is coupled to the second input terminal of the comparator, the second terminal is coupled to the reference ground.

16. The switching converter of claim 10, wherein the ramp generator further comprises a eleventh transistor having a first terminal, a second terminal and a control terminal, wherein the first terminal is coupled to the second terminal of the controllable current source, the second terminal is coupled to the first terminal of the first capacitor, the control terminal is coupled to the second input terminal of the adaptive current logic circuit.

17. A control method used in a switching converter, wherein the switching converter comprises a main transistor and an inductor coupled to the main transistor, and is configured to provide an output voltage, the control method comprises:

generating an on-time control signal;

generating a ramp signal and regulating the level of the ramp signal to be equal to the level of a common mode voltage when the status of the main transistor is changed from OFF to ON;

generating a comparison signal based on the ramp signal, the common mode voltage, a reference signal and a feedback signal indicative of the output voltage; and generating a control signal to control the main transistor based on the on-time control signal and the comparison signal.

18. The control method of claim 17, further comprising:

detecting a zero cross of the current flowing through the inductor; and regulating the level of the ramp signal to be equal to the level of a common mode voltage when the zero cross of the inductor current is detected.

* * * * *